Figure 1:
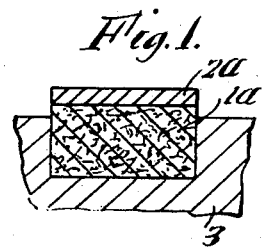

United States Patent

[11] 3,633,926

[72] Inventors Waldemar Hryniszak
 Cullercoats, North Shields;
 Robert Porteous Graham, Durham City,
 both of England
[21] Appl. No. 819,547
[22] Filed Apr. 28, 1969
[45] Patented Jan. 11, 1972
[73] Assignee Clarke, Chapman & Co. Limited
 Gateshead, Durham County, England
[32] Priority Apr. 29, 1968
[33] Great Britain
[31] 20,296/68

[54] HIGH-TEMPERATURE SEALS
 12 Claims, 9 Drawing Figs.
[52] U.S. Cl...................................................... 277/96,
 165/9
[51] Int. Cl........................................................ F16j 15/16
[50] Field of Search........................................... 277/96,
 227, 228, 231, 235, 235 A, 235 B, 236, 234, 81;
 165/9

[56] References Cited
 UNITED STATES PATENTS
3,053,694 9/1962 Daunt et al. .................. 277/81
3,108,632 10/1963 Jensen et al. .................. 165/9
3,209,813 10/1965 Hryniszak..................... 277/81
3,327,770 6/1967 Brandt.......................... 277/96
2,425,209 8/1947 Snyder et al. ................. 277/96
2,249,930 7/1941 Bailey et al. .................. 277/96 X
2,164,764 7/1939 Claypoole .................... 277/228 X
3,000,846 9/1961 Runton et al. ................ 277/96 X FOREIGN PATENTS
20,542 9/1965 Great Britain................ 277/228
1,240,567 8/1960 France ......................... 277/96

Primary Examiner—Herbert F. Ross
Assistant Examiner—Robert I. Smith
Attorney—Jecies and Greenside ABSTRACT: Seals for high-temperature applications have a composite construction including a resilient fibrous ceramic backing layer and a hard surface layer of metal or ceramic supported by the backing layer and providing a sealing face for rubbing contact with the part to be sealed against. Various methods of construction of such seals are described and an arrangement is disclosed in which the density of the backing layer is varied across its thickness to achieve an optimum combination of resiliency with suitable supporting characteristics for the surface layer.

PATENTED JAN 11 1972 3,633,926

HIGH-TEMPERATURE SEALS

This invention relates to seals for use between moving members and capable of operation at relatively high temperatures.

In many applications in engineering it is necessary to provide seals which are in sliding engagement with a moving member and which have to operate in a high-temperature environment. In rotary regenerative heat exchangers, for example, a disc or cylindrical drum-type rotor rotates in a stator casing passing alternately through hot fluid and cold fluid compartments in the casing. Where the fluids are at different pressures it is necessary to have seals engaging the rotor to seal against leakage over the rotor surface between the different compartments.

Differential expansion can result in dimensional changes which reduce the efficiency of the seals and generally speaking the ideal seal for such purposes is one which has sufficient flexibility to enable it to adjust to dimensional changes while at the same time having hard wearing and low-friction properties in unlubricated rubbing contact.

A seal according to the invention has a composite construction comprising a surface element providing a face for a sliding seal and a fibrous backing element supporting said surface element.

In two possible arrangements according to the invention, the surface element may be formed by deposition onto a face of the fibrous backing element or the fibrous element may form a resilient housing receiving a separately formed sealing element.

The fibrous backing element is preferably of a ceramic nature, that is to say, of a refractory, high-temperature and/or corrosion resistant nonmetallic material, the fibers being held together with a suitable binder.

The density of the fibrous backing element may be uniform throughout or may vary from a maximum value adjacent to the sealing surface to a minimum value remote from the sealing surface. The density may be varied by building up the backing element in layers, each layer being formed with a binder of different concentration from that of the other layers.

Figures 4, 5:
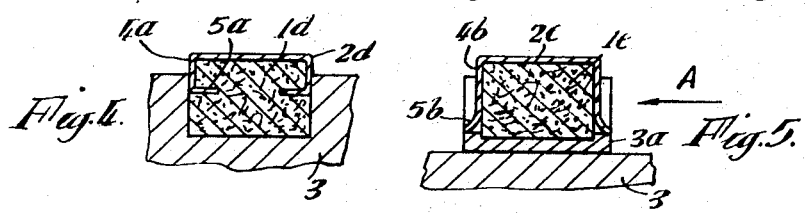
Figure 6:
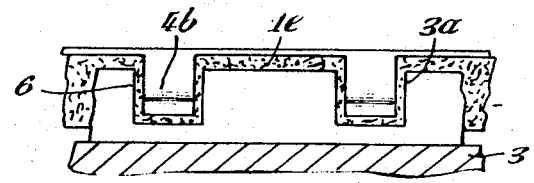
Figure 7A:
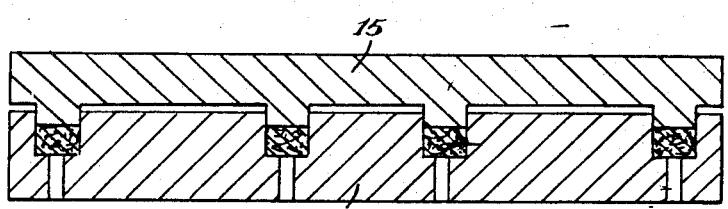
Figure 8:
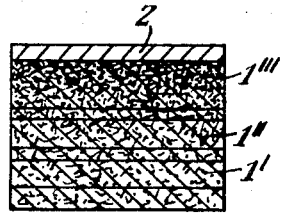
Figure 7B:
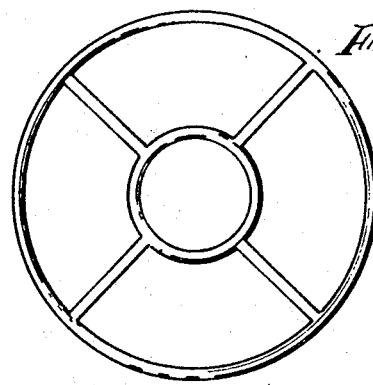

Various embodiments of the invention are illustrated by way of examples in the accompanying drawings in which:

FIGS. 1 to 5 are transverse sections through alternative seals in accordance with the invention, FIG. 6 is a view in the direction of arrow A in FIG. 5, FIG. 7a is a section through a mould for forming fibrous backing element for a seal such as that in FIG. 1, FIG. 7b being an illustration of the seal produced by the mould in plan view, and FIG. 8 shows a transverse section of a seal according to the invention in which the fibrous backing element has a varying density.

Referring first to FIG. 1, the seal comprises a fibrous backing element $1a$ and a wear resistant surface element $2a$ of low friction properties. The seal is located in a housing 3 of one of the members to be sealed.

Figure 2:
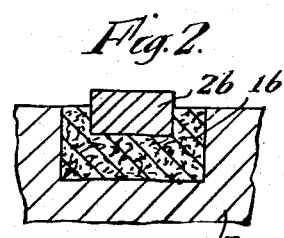
Figure 3:
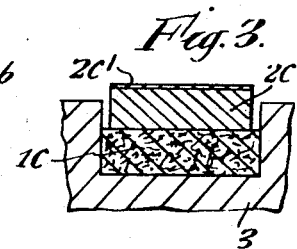

In FIG. 2 the fibrous backing element is in the form of a shoe $1b$ receiving the surface element $2b$ in a recess. In an alternative form (FIG. 3) a housing 3 forms a channel and the backing element $1c$ supports a metal surface element $2c$ that has been formed separate from the backing element. The surface element $2c$ may itself provide the sealing face or it may have a surface layer $2c'$ that takes the rubbing contact for the seal.

In the embodiment of FIG. 4 the surface element comprises a metal member $2d$ which has lugs $4a$ with inturned lips $5a$ fitting into recesses in the sides of the fibrous backing element $1d$.

In the embodiment shown in FIGS. 5 and 6, the surface element is formed by a metal member $2e$ which, with the fibrous element $1e$, is located in a housing $3a$. The housing $3a$ has slots 6 in which seat lugs $4b$ on the member $2e$. The transverse sectional width of the backing element and the main part of the surface element is less than that of the housing $3a$ but outturned lips $5b$ on the lugs $4b$ increase the overall width to that of the housing.

The fibrous backing element can be made from ceramic fibrous materials such as alumino-silicate, chrome stabilized alumino-silicate, carbon fiber (i.e. carbon-fiber blanket), boron nitride etc. manufactured in the form of paper, blanket or bulk fiber.

To form the backing element a bulk fiber mass or sheets of fibrous material cut to the profile of the seal are soaked in a bath containing a liquid binder such as silicon ester or colloidal silica. On removal from the bath the material is lightly pressed to remove surplus binder and then placed in a mould 14 (see FIG. 7) that has been suitably treated with a coating of a material such as polytetrafluorethylene to facilitate subsequent removal of the backing element from the mould. Several layers of the fibrous material may be laid in the mould before a closing member 15 is fitted and compression applied to the material to give the desired thickness and density. The material is left in the mould until completely dry, for example 2 to 3 days of air drying or 4 to 6 hours if oven drying at temperatures up to 180° F. On removal from the mould, the backing element is lightly fettled and in order to prevent spalling is is coated with undiluted liquid binder or a fine mesh coating cement. In FIG. 7 the backing element is in the form of an inner and outer ring of material joined by radial spokes, not shown.

In many applications it is preferably to vary the density of the fibrous backing element. This can be achieved by forming the element in several layers as indicated at $1'$, $1''$ etc., in FIG. 8, and increasing the dilution of the binder (e.g., from nil dilution to 50 percent dilution) for successive layers. The laminations may be compressed in a single moulding operation or each may be allowed to dry out partly under compression before a further lamination is added.

A graded density arrangement is helpful if the surface element is formed by flame or plasma spraying since unless the surface being treated is rigid and sufficiently uniform it can be damaged in the process. By variation of the density of the backing element, a suitably rigid surface is provided for the spraying process without sacrificing the resiliency required in the finished seal.

The surface element 2 can be produced in a number of ways. These include flame or plasma spraying of the fibrous backing element with a hard face metal or a ceramic, or producing the element in a solid hard face metal or ceramic as in the case of elements $2b$ or $2c$. Another way is to flame or plasma spray the face material onto a metal former, such as the members $2d$ and $2e$, which is mounted on the fibrous backing element either integrally on the substrate or simply supported thereon.

In all cases it is desirable to achieve the finest possible surface finish by grinding and lapping the sealing face and it will, of course, be required to ensure that the rotor face with which the seal engages has a similarly high standard finish. If the surface element is of metal it can be further coated with a material having low friction properties if so desired.

If a sprayed surface element is to be formed, the backing element can be mounted on a mandrel and rotated while the spray coating is deposited to the desired thickness. Obviously the temperature and fluid environment of the seal in operation, in addition to the material type of the rotor or other member that it rubs upon, will in many cases dictate the coating material which must be employed. Simply as examples from the range of available materials there can be mentioned $Cr_2O_3+TiO_2$; $Al_2O_3+TiO_2$; $TiO_2$; $Ni_2O_3$; $Al_2O_3$; $ZrO_2$; $Cr_2O_3$; $Cr_3C_2$; WC: et. In the application of a coating care must be exercised to avoid overheating of the substrate and also to ensure an even deposit buildup. On completion of the coating process, the seal is ground on the mandrel then removed for final lapping.

Where the seal has a discrete metal or ceramic surface element, this may be prepared separately from the backing element, if required with spray deposition of a sealing layer as referred to above, before bonding to the backing element using, e.g., a sodium silicate solution. Alternatively, the surface element can be secured to the backing element by being placed in the mould with the fibrous material.

The completed seal may be mounted in a shoe or housing (not shown) of the structure in which it is to be employed and which will provide both location and lateral support for the seal.

Seals made in the manner described above possess a degree of resilience, can be moulded to a variety of shapes and, being principally made of low bulk density ceramic materials possess good thermal shock resistance and low thermal conductivity, while they can be designed to function at high temperature, for example up to 650° C. and above when used with rotary regenerative heat exchangers, without recourse to cooling systems.

What we claim and desire to secure by Letters Patent is:

1. A seal comprising, in combination, a surface element, a face of said element forming a sliding seal face, and an internal resilient fibrous backing element permanently attached to an opposed face of the surface element and supporting said surface element, said backing element being principally composed of low bulk density fibrous materials.

2. A seal according to claim 1 wherein the backing element has a density that varies with the distance from the surface element, the region of greatest density being closest to the surface element.

3. A seal according to claim 1 wherein the surface element comprises a metal member formed separately from the backing element.

4. A seal according to claim 1 wherein auxiliary location pieces are provided on the surface element, said pieces projecting away from the sealing face to engage the backing element so as to prevent relative movement between the surface and backing elements in a plane parallel to the sealing face.

5. A seal according to claim 4 wherein said location pieces lie on opposite side edges of the backing element section, an inwardly directed lip on at least one piece projecting into its associated backing element side edge.

6. A seal according to claim 4 wherein a housing or support means carries the surface and backing elements, said means having a sectional width greater than the backing element, said location pieces of the surface element having outwardly directed lips that increase the overall sectional width of the surface element substantially to that of the housing or support means.

7. A seal according to claim 6 wherein the housing or support means is provided with opposed side surfaces that extend towards the surface element to embrace at least a portion of the depth of the backing element between them, said location pieces being disposed at spaced interruptions of said side surfaces.

8. A seal according to claim 1 wherein a channel or recess on one face of the backing element provides a seat for the surface element.

9. A seal according to claim 1 wherein a coating of low-friction material is provided on the sealing face of the surface element.

10. A seal according to claim 1 wherein the backing element comprises ceramic fibers moulded together with a binding agent.

11. A seal comprising a composite of (a) a surface element having an exposed working face adapted to effect a sliding seal between it and an independent cooperating member movable with respect thereto and (b) an integral resilient support for resiliently supporting said surface element and for providing a seal for the region enclosed thereby, said resilient support being comprised of a fibrous backing element permanently attached to the opposite face of said surface element, said backing element being principally composed of low bulk density fibrous materials.

12. A seal comprising a composite of (a) a surface element having an exposed working face adapted to effect a sliding seal between it and an independent cooperating member movable with respect thereto and (b) a fibrous backing element secured to the opposite face of said surface element, said backing element serving as a resilient support for said surface element and as a seal for the region enclosed thereby, the density of the backing element being varied with the distance from the surface element, the region of greatest density being located closest to said surface element.

* * * * *

UNITED STATES PATENT OFFICE
CERTIFICATE OF CORRECTION

Patent No. 3,633,926     Dated January 11, 1972

Inventor(s) Waldemar Hryniszak et al

It is certified that error appears in the above-identified patent and that said Letters Patent are hereby corrected as shown below:

On the cover sheet [73] the name of the Assignee should read -- CLARKE CHAPMAN-JOHN THOMPSON LIMITED --. Column 3, line 15, "internal" should read -- integral --.

Signed and sealed this 21st day of November 1972.

(SEAL)
Attest:

EDWARD M. FLETCHER, JR.
Attesting Officer

ROBERT GOTTSCHALK
Commissioner of Patents